(12) United States Patent
Readwin et al.

(10) Patent No.: US 8,480,166 B1
(45) Date of Patent: Jul. 9, 2013

(54) AIR DUCTS FOR VEHICLES

(75) Inventors: Michael J. Readwin, Metamora, MI (US); Richard E. Bartos, Davison, MI (US); Michael G. Leffert, Howell, MI (US); Michael E. Nishek, Ortonville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/459,984

(22) Filed: Apr. 30, 2012

(51) Int. Cl.
*B60N 99/00* (2006.01)

(52) U.S. Cl.
USPC ............................................ 296/208; 454/69

(58) Field of Classification Search
USPC .................. 296/208; 280/781, 782; 454/69, 454/71
See application file for complete search history.

(56) References Cited

U.S. PATENT DOCUMENTS

| | | | |
|---|---|---|---|
| 5,210,947 A | | 5/1993 | Donnelly |
| 5,354,114 A | | 10/1994 | Kelman et al. |
| 5,706,170 A | * | 1/1998 | Glovatsky et al. ............ 361/695 |
| 5,762,395 A | * | 6/1998 | Merrifield et al. ....... 296/203.01 |
| 6,152,186 A | * | 11/2000 | Arney et al. .................. 138/129 |
| 6,679,296 B2 | | 1/2004 | Gibson |
| 6,688,680 B1 | * | 2/2004 | Cooper et al. ................ 296/208 |
| 7,300,102 B2 | * | 11/2007 | Gupta et al. .................. 296/208 |
| 2006/0125291 A1 | * | 6/2006 | Buravalla et al. ............. 296/204 |
| 2007/0184773 A1 | | 8/2007 | Babian |

* cited by examiner

*Primary Examiner* — Lori Lyjak
(74) *Attorney, Agent, or Firm* — Quinn Law Group, PLLC

(57) ABSTRACT

An air duct for a vehicle includes a housing and a ductile member. The housing is formed from a first extrudable material having a first elastic modulus, and a second extrudable material having a second elastic modulus that is different from the first. The housing has a central longitudinal axis, defines a cavity therethrough along the axis, and is transitionable from a preform configuration in which the axis is substantially straight, to an installation configuration in which the axis is tortuous. The ductile member is embedded within the housing and is formed from a third extrudable material having a third elastic modulus that is greater than each of the first and second. The ductile member is bendable to transition the housing from the preform configuration to the installation configuration and is configured for retaining the housing in the installation configuration. A vehicle includes the air duct.

20 Claims, 5 Drawing Sheets

AIR DUCTS FOR VEHICLES

TECHNICAL FIELD

The present disclosure generally relates to air ducts for vehicles.

BACKGROUND

Ambient or conditioned air may be channeled from one area of a vehicle to another via an air duct. For example, the air duct may channel heated, cooled, and/or humidified air from one portion of the vehicle, such as an instrument panel, to another portion of the vehicle, such as a rear passenger footwell. Often, a path or routing for the air duct through the vehicle is circuitous, because of obstacles such as seating hardware, electronics, structural components, and the like.

SUMMARY

An air duct for a vehicle includes a housing and a ductile member embedded within the housing. The housing is formed from a first extrudable material having a first elastic modulus, and a second extrudable material that is different from the first extrudable material, and has a second elastic modulus that is different from the first elastic modulus. In addition, the housing has a central longitudinal axis and defines a cavity therethrough along the central longitudinal axis. The housing is transitionable from a preform configuration in which the central longitudinal axis is substantially straight, to an installation configuration in which the central longitudinal axis is tortuous. The ductile member is formed from a third extrudable material having a third elastic modulus that is greater than each of the first elastic modulus and the second elastic modulus. The ductile member is bendable to transition the housing from the preform configuration to the installation configuration, and is configured for retaining the housing in the installation configuration.

In one embodiment, the housing defines a plurality of cavities therethrough each spaced apart from one another. Further, the housing has a length and includes a first channel portion formed from the second extrudable material, and a second channel portion spaced apart from the first channel portion and formed from the second extrudable material. The air duct also includes at least one attachment element configured for attaching the housing to the vehicle. Further, the ductile member is embedded within and encapsulated by the housing, and extends along substantially the entire length of the housing.

A vehicle includes a body defining a passenger compartment. The body includes a first component and a second component spaced apart from the first component. Further, the vehicle includes a system configured for providing conditioned air to the passenger compartment. The system includes a distributor configured for expelling conditioned air from the system, and a vent configured for discharging conditioned air to the passenger compartment. In addition, the vehicle includes an air duct interconnecting the distributor and the vent. The air duct includes a housing formed from a first extrudable material having a first elastic modulus, and a second extrudable material that is different from the first extrudable material and has a second elastic modulus that is different from the first elastic modulus. The housing has a central longitudinal axis and defines a cavity therethrough along the central longitudinal axis. Further, the housing is transitionable from a preform configuration in which the central longitudinal axis is substantially straight, to an installation configuration in which the central longitudinal axis is tortuous so that the housing flexibly abuts the first component and the second component. The air duct also includes a ductile member embedded within the housing and formed from a third extrudable material having a third elastic modulus that is greater than each of the first elastic modulus and the second elastic modulus. The ductile member is bendable to transition the housing from the preform configuration to the installation configuration, and is configured for retaining the housing in the installation configuration.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1A:
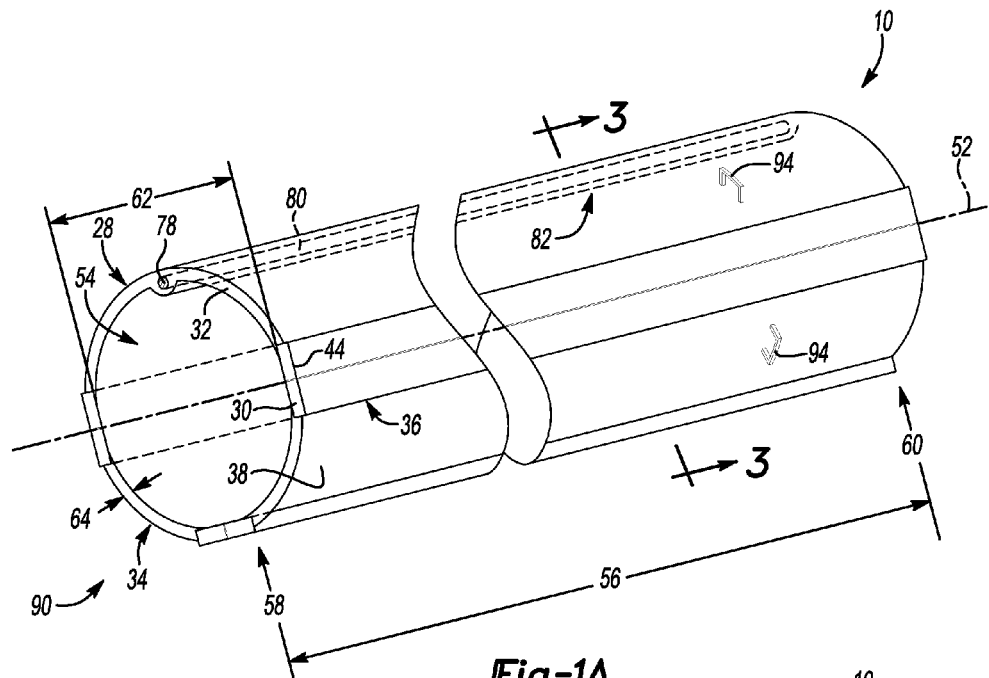
FIG. 1A is a schematic perspective fragmentary illustration of an air duct, wherein the air duct is disposed in a preform configuration.
Figure 1B:
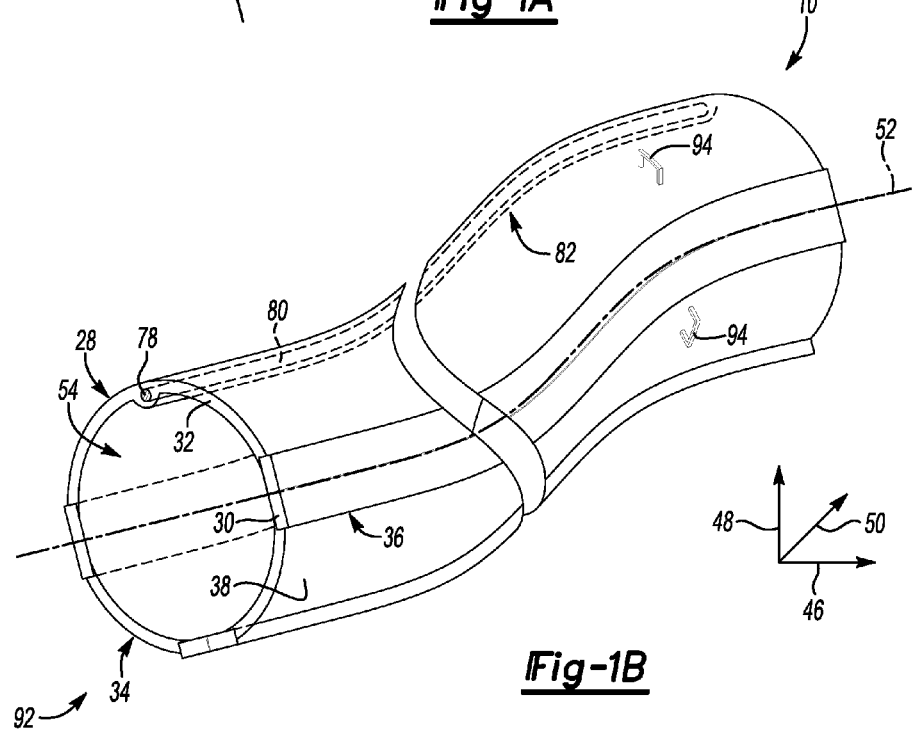
FIG. 1B is a schematic perspective fragmentary illustration of the air duct of FIG. 1A, wherein the air duct is disposed in an installation configuration.
Figure 2A:
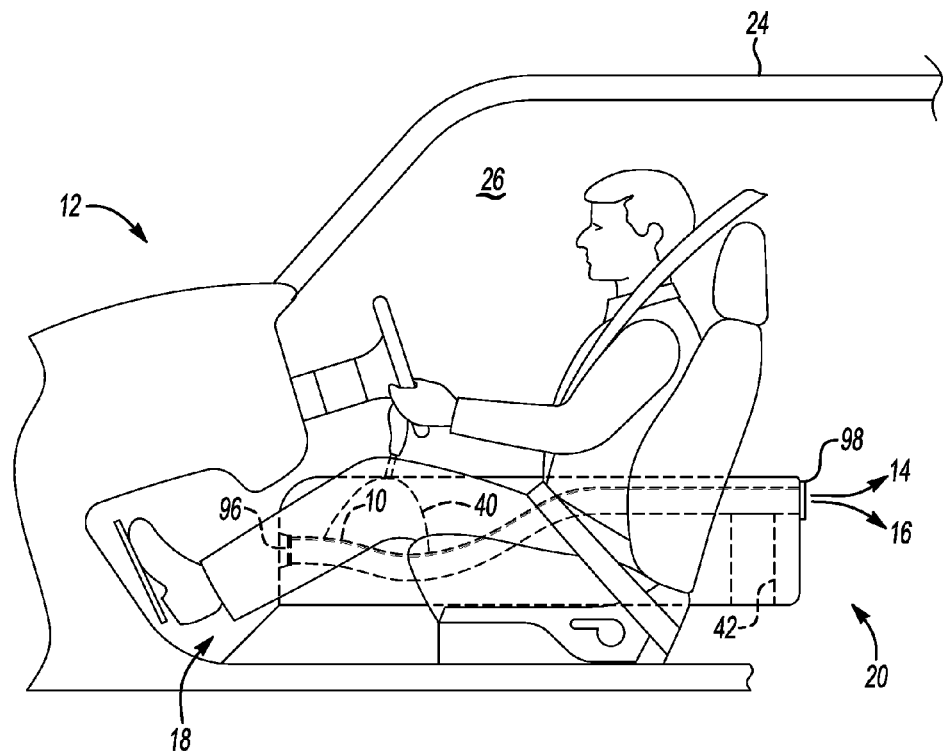
FIG. 2A is a schematic fragmentary illustration of a cut-away side view of a vehicle including the air duct of FIG. 1B.
Figure 2B:
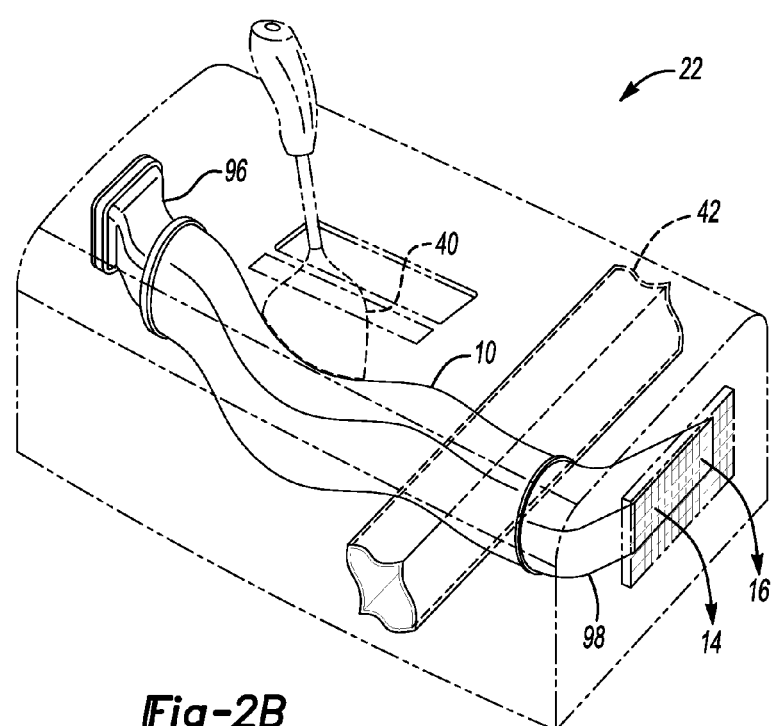
FIG. 2B is a schematic perspective illustration of a system of the vehicle of FIG. 2A, wherein the system includes the air duct of FIG. 1B.
Figure 3:
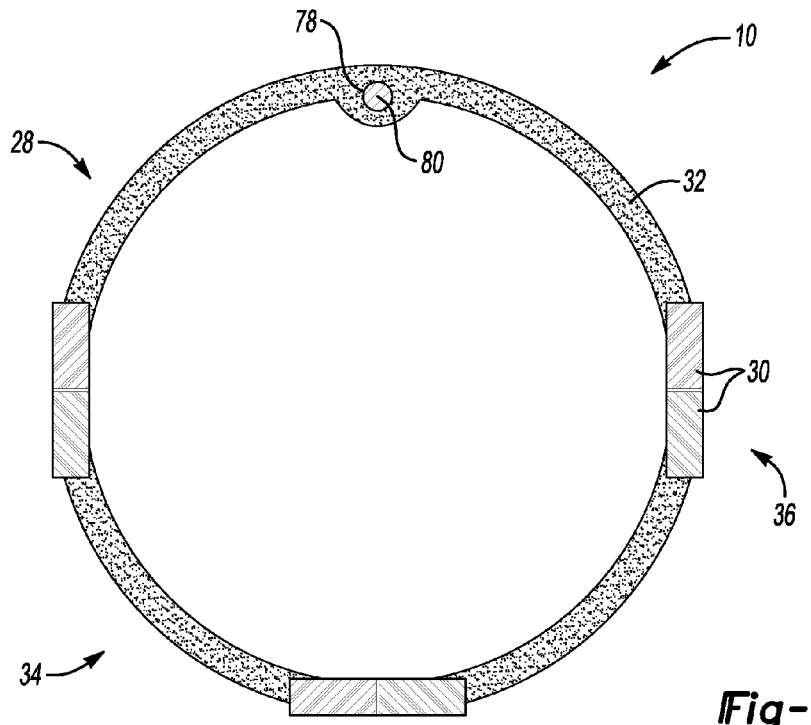
FIG. 3 is a schematic cross-sectional illustration of the air duct of FIG. 1A, taken along section line 3-3.
Figure 4:
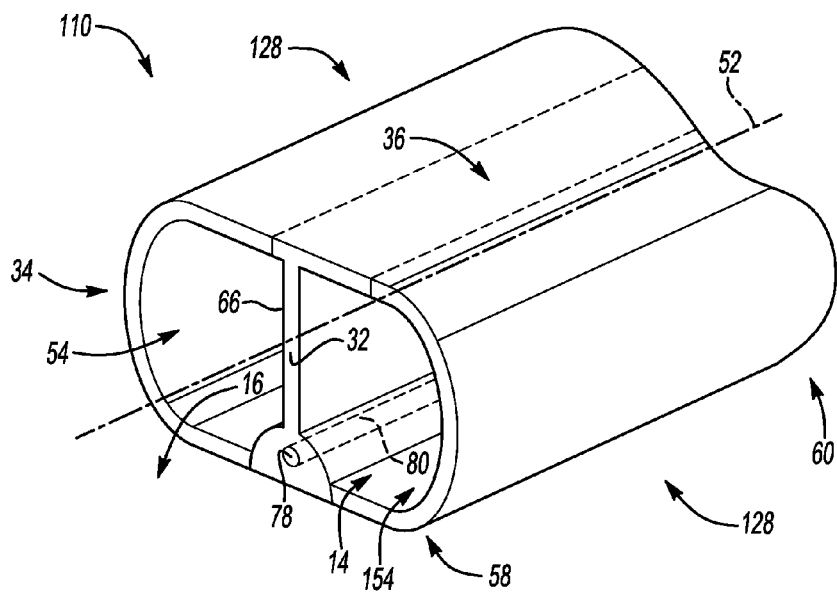
FIG. 4 is a schematic perspective fragmentary illustration of another embodiment of the air duct of FIGS. 1A and 1B.

Referring to the Figures, wherein like reference numerals refer to like elements, an air duct 10 for a vehicle 12 (FIG. 2A) is shown generally in FIGS. 1A and 1B. As shown in FIGS. 2A and 2B, the air duct 10 may be useful for transferring ambient and/or conditioned air (represented generally by arrows 14, 16) from one portion 18 (FIG. 2A) of the vehicle 12 to another portion 20 (FIG. 2A) of the vehicle 12. For example, the air duct 10 may transfer conditioned air 14, 16 to a rear passenger footwell (not shown) of the vehicle 12. As such, the air duct 10 may be a component of a system (shown generally at 22 in FIG. 2B) of the vehicle 12, such as a heating, ventilation, and air conditioning (HVAC) system. However, the air duct 10 may also be useful for non-automotive applications including construction, appliance, and aviation applications.

Referring now to FIG. 2A, directional terminology used herein pertaining to the vehicle 12 is understood by one skilled in the art. For example, terminology such as "front", "forward", and "fore" generally refers to a leading portion of the vehicle 12 with respect to a direction of vehicle travel.

Likewise, terminology such as "rear", "rearward", and "aft" generally refers to a trailing portion of the vehicle 12 with respect to the direction of vehicle travel. Further, the vehicle 12 includes a body 24 defining a passenger compartment (shown generally at 26), and components not disposed within the passenger compartment 26 are generally referenced as the body 24 of the vehicle 12.

Referring again to FIG. 1A, the air duct 10 includes a housing 28 formed from a first extrudable material (represented generally at 30) having a first elastic modulus, and a second extrudable material (represented generally at 32) that is different from the first extrudable material 30, and has a second elastic modulus that is different from the first elastic modulus. That is, as set forth in more detail below, the second extrudable material 32 may be stiffer than the first extrudable material 30. Alternatively, the second extrudable material 32 may be less stiff than the first extrudable material 30. As used herein, the terminology "extrudable" refers to a material that is pushable and/or drawable through a die (not shown) to compress and/or shear the material to thereby form a component, e.g., the housing 28, having a desired cross-sectional shape or configuration. Further, as used herein, the terminology "elastic modulus" refers to a Young's modulus of elasticity, E, and may be measured at ambient temperature.

With continued reference to FIG. 1A, the first extrudable material 30 may be selected from any material that is suitable for use in an extruder (not shown) during an extrusion process. Alternatively, the first extrudable material 30 may be moldable, such as blow-moldable, in a molding apparatus (not shown). By way of non-limiting examples, the first extrudable material 30 may be selected from the group including polymer materials, such as, but not limited to, polypropylene, polyethylene, polyurethane, and combinations thereof; foams; elastomers; rubbers, such as, but not limited to, thermoplastic vulcanized rubber, ethylene propylene diene monomer rubber, and combinations thereof; and combinations of the foregoing materials. In one embodiment, the first extrudable material 30 may be ethylene propylene diene monomer rubber. In another embodiment, the first extrudable material 30 may be formed from a blend of ethylene propylene diene monomer rubber and polypropylene.

The first elastic modulus of the first extrudable material 30 may be from about 0.01 GPa to about 2 GPa, e.g., from about 0.01 GPa to about 1.7 GPa, or, more specifically, from about 0.05 GPa to about 1.5 GPa. That is, the first extrudable material 30 may provide the housing 28 with excellent flexibility and resiliency, as set forth in more detail below.

With continued reference to FIG. 1A, the second extrudable material 32 may also be selected from any material that is suitable for use in an extruder (not shown) during an extrusion process. Alternatively, the second extrudable material 32 may be moldable, such as blow-moldable, in a molding apparatus (not shown). However, the second extrudable material 32 is different from the first extrudable material 30. That is, the first extrudable material 30 and the second extrudable material 32 are different materials. However, by way of non-limiting examples, the second extrudable material 32 may also be selected from the group including polymer materials, such as, but not limited to, polypropylene, polyethylene, polyurethane, and combinations thereof; foams; elastomers; rubbers, such as, but not limited to, thermoplastic vulcanized rubber, ethylene propylene diene monomer rubber, and combinations thereof; and combinations of the foregoing materials. In one embodiment, the second extrudable material 32 may be polypropylene.

The second elastic modulus of the second extrudable material 32 may be from about 0.5 GPa to about 4 GPa, e.g., from about 1 GPa to about 4 GPa, or, more specifically, from about 0.8 GPa to about 3.5 GPa. That is, the second extrudable material 32 may be comparatively stiffer than the first extrudable material 30 upon formation of the housing 28. Alternatively, the second extrudable material 32 may be less stiff than the first extrudable material 30 upon formation of the housing 28. Stated differently, the housing 28 may include sections (denoted as 34, 36 in FIGS. 1A, 1B, 3, and 4-7) of unequal stiffness. Therefore, the second extrudable material 32 may also provide the housing 28 with excellent flexibility and resiliency, but may be comparatively stiffer or less stiff than the first extrudable material 30, as set forth in more detail below.

More specifically, as best shown in FIGS. 1A and 1B, the housing 28 may have an outer wall 38 configured for flexibly abutting the vehicle 12 (FIG. 2A). In one embodiment, the second extrudable material 32 may form a majority of the outer wall 38. As such, when the air duct 10 is installed in the vehicle 12, the housing 28 may deform slightly when pressed against other components (e.g., a first component 40 (FIG. 2B) and/or a second component 42 (FIG. 2B)) of the vehicle 12.

With continued reference to FIGS. 1A and 1B, for this embodiment, the housing 28 may include a plurality of hinges 44 each formed from the first extrudable material 30 and spaced apart from one another. For example, the plurality of hinges 44 may be formed from ethylene propylene diene monomer rubber, or from a blend of ethylene propylene diene monomer and polypropylene, and may each be configured as a living hinge so that the air duct 10 may collapse and/or flex in three dimensions, i.e., an x-dimension, y-dimension, and z-dimension (represented generally by 46, 48, and 50 in FIG. 1B). That is, the air duct 10 may be bendable in any plane.

Referring again to FIG. 1A, the housing 28 has a central longitudinal axis 52 and defines a cavity 54 therethrough along the central longitudinal axis 52. That is, the housing 28 may have a length 56, and may define the cavity 54 lengthwise along the air duct 10. As such, conditioned air, i.e., heated and/or cooled air 14, 16 (FIG. 2A), may be transmitted through the cavity 54 from a proximal end 58 of the housing 28 to a distal end 60 of the housing 28.

With continued reference to FIG. 1A, the cavity 54 may have any shape or configuration. That is, although illustrated as having a generally circular or half-moon shape in the Figures, the cavity 54 may have any shape or configuration according to a desired application of the air duct 10. By way of non-limiting examples, the cavity 54 may be circular, oval, half-moon, rectangular, triangular, square, irregular, D-shaped, X-shaped, or a combination thereof. For example, although dependent on the desired application of the air duct 10, the cavity 54 may have a width 62 of from about 20 mm to about 2,400 mm, e.g., from about 20 mm to about 75 mm. That is, air ducts 10 configured to transport a large quantity of conditioned air 14, 16 (FIG. 2A) may have a comparatively larger width 62 than air ducts 10 configured to transport a small quantity of conditioned air 14, 16. In addition, although likewise dependent upon the desired application of the air duct 10, the housing 28 may have a thickness 64 of from about 1 mm to about 15 mm, e.g., from about 5 mm to about 12 mm.

Referring now to FIGS. 4-7, in one embodiment, the housing 128 may define a plurality of cavities 54 (FIGS. 4-6), 154 (FIGS. 4-6), 254 (FIG. 7) therethrough parallel to the central longitudinal axis 52, and each of the plurality of cavities 54, 154, 254 may be spaced apart from one another. For example, referring to FIG. 4, the housing 128 may define a first cavity 54 and a second cavity 154 spaced apart from the first cavity 54. The first cavity 54 may be configured for transmitting cooled air 16 between the proximal end 58 and the distal end 60 of the housing 28, and the second cavity 154 may be configured for transmitting heated air 14 between the proximal end 58 and the distal end 60. In this embodiment, the plurality of cavities 54, 154 may be spaced apart from one another by a comparatively-stiffer portion of the housing 128, e.g., a support member 66 formed from the second extrudable material 32. The support member 66 may have any shape or configuration, e.g., an I-beam, and may provide the housing 128 with strength and protection from collapse. For this embodiment, the air duct 110 may be useful for transmitting both heated air 14 and cooled air 16. For example, the air duct 110 may be a side demister and instrument panel conduit for the vehicle 12 (FIG. 2A).

Figure 5:
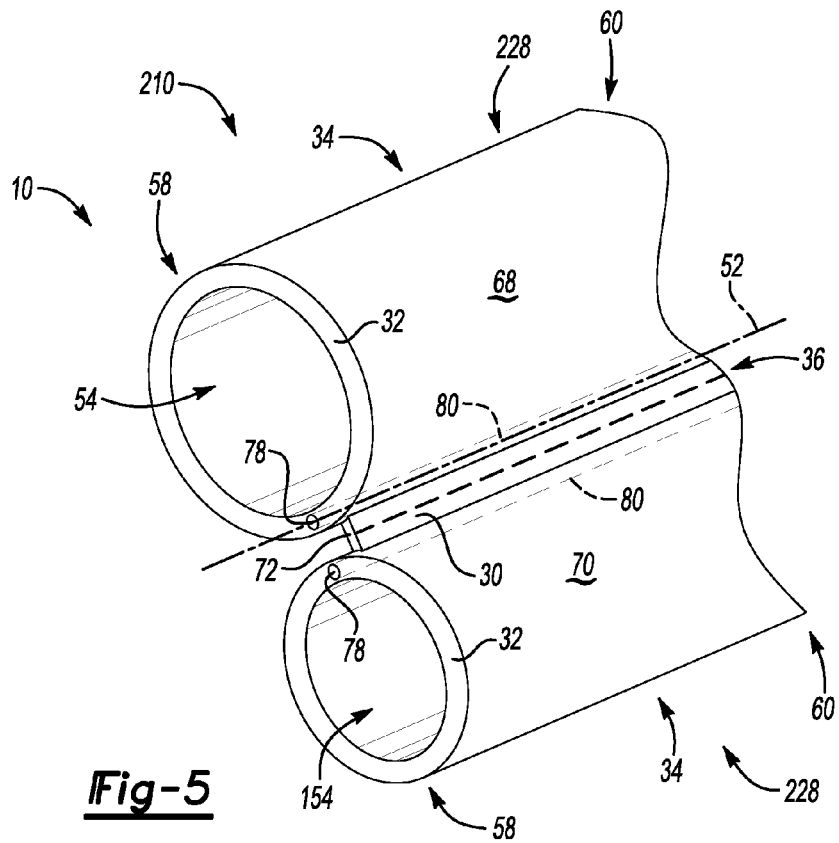
FIG. 5 is a schematic perspective fragmentary illustration of yet another embodiment of the air duct of FIGS. 1A, 1B, and 4.

Referring now to FIG. 5, in another embodiment, the housing 228 may include a first channel portion 68 formed from the second extrudable material 32, and a second channel portion 70 spaced apart from the first channel portion 68 and formed from the second extrudable material 32. It is to be appreciated that, although not shown, the first channel portion 68 and the second channel portion 70 may have different lengths. Further, for this embodiment, the housing 228 may further include a connector 72 formed from the first extrudable material 30 and configured for releasably connecting the first channel portion 68 and the second channel portion 70. For example, the connector 72 may be perforated so that the first channel portion 68 may be separated from the second channel portion 70. Advantageously, for this embodiment, the air duct 210 may be formed, e.g., extruded and/or molded, so that the first channel portion 68 is connected to the second channel portion 70 by the connector 72. However, in use when installed into the vehicle 12 (FIG. 2A), the first channel portion 68 may be entirely or partially separated from the second channel portion 70 along the length 56 (FIG. 1A) of the housing 228.

As such, with continued reference to FIG. 5, the air duct 210 may be useful for applications requiring multiple conduits or channels within a confined space. For example, although not shown, for this embodiment, the first channel portion 68 and the second channel portion 70 may partially separate around the first component 40 (FIG. 2B), e.g., a gear shift, of the vehicle 12 (FIG. 2A), or may separate to transmit conditioned air 14, 16 (FIG. 2B) to both right-side and left-side rear passenger footwells (not shown) of the vehicle 12. Alternatively or additionally, the first channel portion 68 may be an intake channel or conduit, while the second channel portion 70 may be an exhaust channel or conduit. Conversely, the second channel portion 70 may be an intake channel or conduit, while the first channel portion 68 may be an exhaust channel or conduit. In addition, it is to be appreciated that the first channel portion 68 and the second channel portion 70 may be the same size, or may be differently-sized. Likewise, the first channel portion 68 and the second channel portion 70 may have the same length or may have different lengths.

Figure 6:
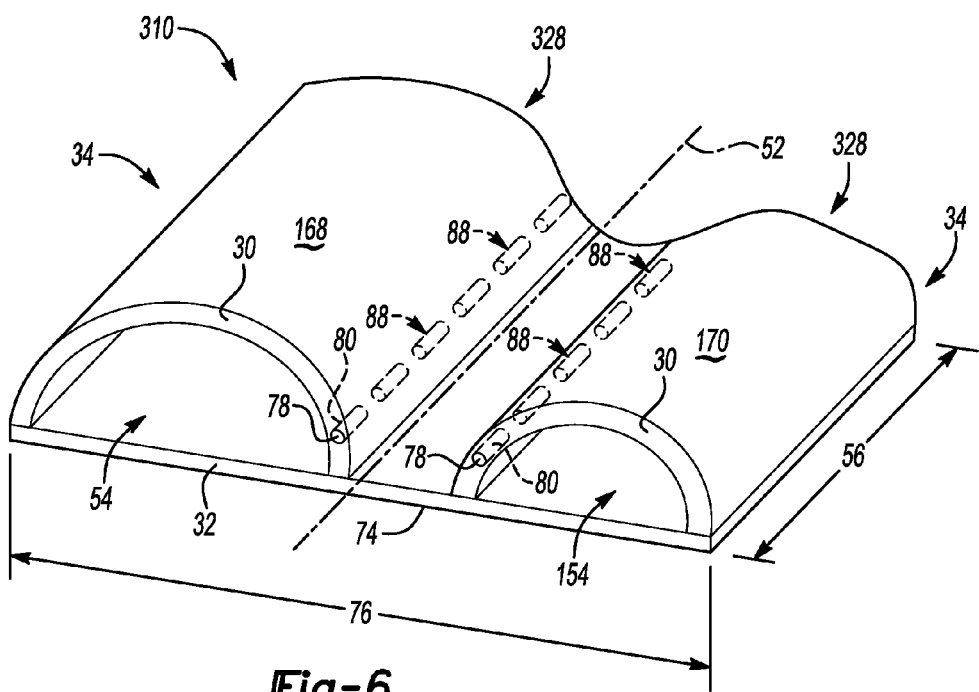
FIG. 6 is a schematic perspective fragmentary illustration of a further embodiment of the air duct of FIGS. 1A, 1B, 4, and 5.

Referring now to FIG. 6, in yet another embodiment, the housing 328 may include the first channel portion 168 spaced laterally from the second channel portion 170. That is, the first channel portion 168 may be symmetrically opposed to the second channel portion 170 about the central longitudinal axis 52. Further, the comparatively-stiffer portion of the housing 328 may include a base member 74 formed from the second extrudable material 32. That is, the base member 74 may extend along a total width 76 of the air duct 310 and may have a flattened shape. As such, for this embodiment, the comparatively less-stiff portion of the housing 328 may be formed from the first extrudable material 30 and may have a semi-circular shape or arrangement. Alternatively, although not shown, the base member 74 may be formed from the first extrudable material 30 and the comparatively stiffer portion of the housing 328 may be formed from the second extrudable material 32. As such, the air duct 310 may be useful as right-side and left-side rear floor channels for the vehicle 12 (FIG. 2A).

Figure 7:
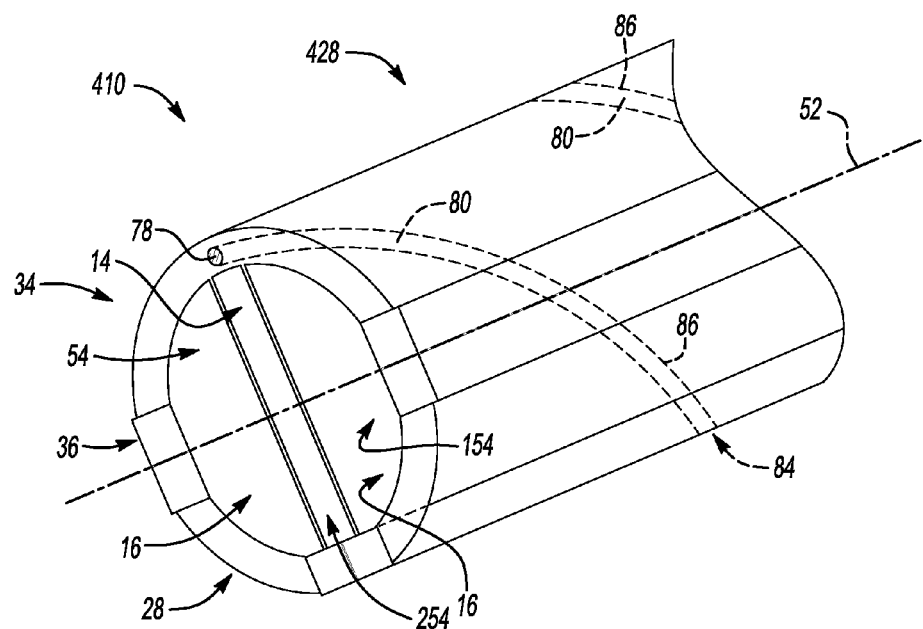
FIG. 7 is a schematic perspective fragmentary illustration of an additional embodiment of the air duct of FIGS. 1A, 1B, 4, 5, and 6.

Referring now to FIG. 7, in a further embodiment, the housing 428 may define a third cavity 254 in addition to the first cavity 54 and the second cavity 154. In particular, the third cavity 254 may be disposed between the first cavity 54 and the second cavity 154. In this embodiment, heated air 14 may be transferred within, for example, the third cavity 254, while cooled air 16 may be transferred within each of the first cavity 54 and the second cavity 154. As such, the air duct 410 may be useful for cooling a battery (not shown) of a hybrid electric vehicle (not shown).

Referring again to the Figures, the air duct 10, 110, 210, 310, 410 further includes a ductile member 78 embedded within the housing 28, 128, 228, 328, 428 and formed from a third extrudable material 80 having a third elastic modulus that is greater than each of the first elastic modulus and the second elastic modulus. That is, the third extrudable material 80 may be comparatively stiffer than both of the first extrudable material 30 and the second extrudable material 32. The third extrudable material 80 may be selected from any material that is suitable for use in an extruder (not shown) during an extrusion process. Alternatively, the first extrudable material 30 and second extrudable material 32 may be molded about the third extrudable material 80.

By way of non-limiting examples, the third extrudable material 80 may be selected from the group including metals, such as, but not limited to, steel, aluminum, nickel, titanium, iron, copper, and composites and alloys thereof; active materials, and combinations of the foregoing. As used herein, the terminology "active materials" refers to a material, such as a shape-memory polymer or shape-memory alloy, that has a first temperature-dependent state and a second temperature-dependent state, wherein the active material is transitionable between the first temperature-dependent state and the second temperature-dependent state in response to a change in temperature. In one embodiment, the third extrudable material 80 may be aluminum. In another embodiment, the third extrudable material 80 may be an active material including an alloy of nickel and titanium, e.g., a shape-memory alloy. The third elastic modulus of the third extrudable material 80 may be from about 3 GPa to about 250 GPa, e.g., from about 10 GPa to about 225 GPa, or, more specifically, from about 125 GPa to about 210 GPa.

As shown in FIGS. 1A, 1B, and 3-7, the ductile member 78 is embedded within the housing 28, 128, 228, 328, 428. The ductile member 78 may be embedded within the housing 28, 128, 228, 328, 428 in any manner. For example, the first extrudable material 30, second extrudable material 32, and third extrudable material 80 may be co-extruded to form the air duct 10, 110, 210, 310, 410. Alternatively, the first extrudable material 30, second extrudable material 32, and third extrudable material 80 may be molded, e.g., blow molded, to form the air duct 10, 110, 210, 310, 410. As such, the housing 28, 128, 228, 328, 428 may encapsulate the ductile member 78.

By way of a non-limiting example, in one embodiment, the first extrudable material 30 may be a polymer, i.e., a first polymer, the second extrudable material 32 may be a second polymer that is different from the first polymer, and the third extrudable material 80 may be a metal. Therefore, the housing

28, 128, 228, 328, 428 may provide the air duct 10, 110, 210, 310, 410 with flexibility, resiliency, compressibility, and flattenability, while the ductile member 78 may provide the air duct 10 with shape-retention and strength.

With continued reference to FIGS. 1A, 1B, and 3-7, the ductile member 78 may have any configuration and may extend along substantially the entire length 56 (FIGS. 1A and 6) of the housing 28, 128, 228, 328, 428. For example, in one embodiment, the ductile member 78 may be a continuous wire (shown generally at 82 in FIGS. 1A and 1B). In another embodiment, although not shown, the ductile member 78 may be a hollow tube. Further, as shown generally in FIG. 1A, the ductile member 78 may extend through the housing 28 and may be disposed substantially parallel to the central longitudinal axis 52. In addition, although not shown but described in general with reference to FIG. 5, it is to be appreciated for the embodiment in which the first channel portion 68 and the second channel portion 70 have different lengths, the ductile member 78 may extend along substantially the entire respective lengths (not shown) of the first channel portion 68 and the second channel portion 70.

Alternatively, as shown generally in FIG. 7, in another embodiment, the ductile member 78 may be configured as an elongated helix (denoted generally by 84) wound about the central longitudinal axis 52. The elongated helix 84 may include a plurality of turns 86, wherein one turn 86 is equal to a complete revolution about the central longitudinal axis 52, and each of the plurality of turns 86 may be widely spaced apart from one another to define a pitch or slope of the elongated helix 84. In particular, the pitch or slope of the elongated helix 84 may be from about 1:10 to about 1:20, as measured as a ratio of height in the y-dimension 48 (FIG. 1B) to length in the x-dimension 46 (FIG. 1B). As such, the elongated helix 84 may not be tightly-wound, but may rather be loosely-wound about the central longitudinal axis 52. Further, the housing 428 may not have a corrugated configuration or appearance. Rather, the elongated helix 84 may gradually extend along the housing 428 to provide the air duct 410 with excellent shape retention after bending.

Alternatively or additionally, as best shown in FIG. 6, the ductile member 78 may be discontinuous and may include a plurality of reinforcing elements 88 spaced apart from one another along substantially the entire length 56 of the housing 328. For example, the ductile member 78 may be configured as a discontinuous wire or tube. Further, as best shown in FIGS. 5 and 6, for embodiments including the first channel portion 68, 168 and the second channel portion 70, 170, the ductile member 78 may be embedded in each of the first channel portion 68, 168 and the second channel portion 70, 170. That is, the ductile member 78 may be embedded within the housing 228, 328 that defines each of the first channel portion 68, 168 and the second channel portion 70, 170.

Referring again to the Figures, and specifically described with reference to FIGS. 1A and 1B, the housing 28 is transitionable from a preform configuration 90 (FIG. 1A) in which the central longitudinal axis 52 is substantially straight, to an installation configuration 92 (FIG. 1B) in which the central longitudinal axis is tortuous. For example, after formation by extrusion or molding, the air duct 10 may have a substantially straight shape and may be generally configured as a cylinder in the preform configuration 90. For storage and/or transport purposes, the formed air duct 10 may be wound into a roll or coil (not shown). As such, it is to be appreciated that the central longitudinal axis 52 may have a minimal curvature, e.g., after being unrolled after storage and/or transport, and still be considered substantially straight. In contrast, the central longitudinal axis 52 may be bent, twisted, or substantially curved when the housing 28 is disposed in the installation configuration 92. In general, the terminology "preform configuration" refers to a shape or configuration of the housing 28 before installation of the air duct 10 into the vehicle 12 (FIG. 2A), and the terminology "installation configuration" refers to a shape or configuration of the housing 28 during or after installation or placement of the air duct 10 into the vehicle 12.

More specifically, with continued reference to FIGS. 1A and 1B, the ductile member 78 is bendable to transition the housing 28 from the preform configuration 90 (FIG. 1A) to the installation configuration 92 (FIG. 1B). That is, in preparation for installation of the air duct 10 into the vehicle 12 (FIG. 2A), the air duct 10 may be unwound from a storage coil (not shown), cut to a desired length 56 (FIG. 1A), and bent into the installation configuration 92 so that the central longitudinal axis 52 is tortuous (as shown generally in FIG. 1B) and no longer substantially straight (as shown generally in FIG. 1A). Thereafter, the air duct 10 may be installed into the vehicle 12 in the installation configuration 92 wherein the air duct 10 may resiliently abut other components 40, 42 (FIG. 2B) of the vehicle 12. For example, the outer wall 38 may contact one or more components 40, 42 and deform slightly when the air duct 10 is installed into the vehicle 12. Further, the housing 28 may be flattenable if necessary, and may extend along an entire length (not shown) of the vehicle 12.

In addition, as described with reference to FIG. 1B, the ductile member 78 is configured for retaining the housing 28 in the installation configuration 92. That is, since the ductile member 78 is ductile and bendable, the ductile member 78 may be bent into any configuration in any dimension 46, 48, 50 so that the central longitudinal axis 52 is tortuous, and the housing 28 is formed into a desired shape for installation into the vehicle 12 (FIG. 2A) in the installation configuration 92. Stated differently, the housing 28 may be positionable in three dimensions 46, 48, 50 to transition the housing 28 from the preform configuration 90 (FIG. 1A) to the installation configuration 92. As such, the air duct 10 may be useful for applications requiring a convoluted path or routing through the vehicle 12.

Referring again to FIG. 1A, the air duct 10 may further include at least one attachment element 94 configured for attaching the housing 28 to the vehicle 12 (FIG. 2A). For example, the air duct 10 may include a plurality of attachment elements 94 spaced apart from one another along the housing 28. The at least one attachment element 94 may have any configuration, and may be, for example, a clip. Alternatively, the at least one attachment element 94 may be a void (not shown) defined by the housing 28 and configured for receiving, for example, a weld post (not shown).

Referring again to FIG. 2A, the vehicle 12 of the present disclosure includes the body 24, and the body 24 defines the passenger compartment 26. The body 24 also includes the first component 40 and the second component 42 spaced apart from the first component 40. The first and second component 40, 42 may be any component of the vehicle 12, e.g., floor pans, seats, wiring harnesses, electronic control modules, carpeting, consoles, speakers, gear shifts, reinforcing beams, structural elements, and the like. For example, as shown in FIG. 2B, the first component 40 may be a gear shift, and the second component 42 may be a reinforcing beam. Further, a path between the first component 40 and the second component 42 may be tortuous and/or convoluted.

With continued reference to FIGS. 2A and 2B, the vehicle 12 (FIG. 2A) also includes the system 22 (FIG. 2B) configured for providing conditioned air 14, 16 to the passenger compartment 26. For example, the system 22 may be a heating, ventilation, and air-conditioning (HVAC) system for the vehicle 12, and, although not shown, may include, for example, one or more compressors, condensers, evaporators, expansion valves, receiver dryers, and/or blowers.

Further, as best shown in FIG. 2B, the system 22 includes a distributor 96 configured for expelling the conditioned air 14, 16 from the system 22, and a vent 98 configured for discharging conditioned air 14, 16 to the passenger compartment 26 (FIG. 2A). The distributor 96 may be disposed at one portion 18 (FIG. 2A) of the vehicle 12, and the vent 98 may be disposed at another portion 20 (FIG. 2A) of the vehicle 12. For example, the distributor 96 may be disposed adjacent an engine (not shown) and/or a battery (not shown) of the vehicle 12, and the vent 98 may be spaced apart from the distributor 96 at the rear of the vehicle 12.

With continued reference to FIGS. 2A and 2B, the vehicle 12 also includes the air duct 10, 110, 210, 310, 410 interconnecting the distributor 96 and the vent 98. As such, the air duct 10, 110, 210, 310, 410 may transfer the conditioned air 14, 16 from the system 22 to the vent 98 so that the vent 98 may discharge the conditioned air 14, 16 to the passenger compartment 26.

The aforementioned air duct 10, 110, 210, 310, 410 of the vehicle 12 (FIG. 2A) is flexible and able to conform to positioning requirements within the vehicle 12. For example, the air duct 10, 110, 210, 310, 410 may twist through narrow clearances and may flexibly abut components 40, 42 (FIG. 2B) of the vehicle 12. Additionally, the air duct 10, 110, 210, 310, 410 retains stiffness and minimizes collapse of the air duct 10, 110, 210, 310, 410 during use, yet is sufficiently ductile to retain the installation configuration 92 (FIG. 1B).

The air duct 10, 110, 210, 310, 410 is also economical to manufacture, and is compatible with any vehicle 12 (FIG. 2A). That is, the air duct 10, 110, 210, 310, 410 minimizes dedicated ductwork associated with only certain vehicles 12. Further, the air duct 10 may be manufactured with standard equipment, and does not require unique tool, die, and/or mold designs. That is, tooling, extrusion, and/or mold equipment may be easily modified and reused during prototyping and manufacturing of the air duct 10, 110, 210, 310, 410. Further, the air duct 10, 110, 210, 310, 410 simplifies vehicle assembly and manufacturing and eliminates multiple part numbers and costs associated with design changes.

In addition, for the embodiment including the plurality of cavities 54 (FIGS. 4-6), 154 (FIGS. 4-6), 254 (FIG. 7), the air duct 110, 210, 310, 410 provides excellent fluid flow control for the vehicle 12 (FIG. 2A). Since the air duct 10, 110, 210, 310, 410 is bendable and retainable in the installation configuration 92 (FIG. 1B), the air duct 10, 110, 210, 310, 410 and vehicle 12 also provide efficient air transfer from one portion 18 (FIG. 2A) of the vehicle 12 to another, remote portion 20 (FIG. 2A) of the vehicle 12.

While the best modes for carrying out the disclosure have been described in detail, those familiar with the art to which this disclosure relates will recognize various alternative designs and embodiments for practicing the disclosure within the scope of the appended claims.

The invention claimed is:
1. An air duct for a vehicle, the air duct comprising:
a housing formed from:
a first extrudable material having a first elastic modulus; and
a second extrudable material that is different from the first extrudable material and has a second elastic modulus that is different from the first elastic modulus;
wherein the housing has a central longitudinal axis and defines a cavity therethrough along the central longitudinal axis;
wherein the housing is transitionable from a preform configuration in which the central longitudinal axis is substantially straight, to an installation configuration in which the central longitudinal axis is tortuous; and
a ductile member embedded within the housing and formed from a third extrudable material having a third elastic modulus that is greater than each of the first elastic modulus and the second elastic modulus;
wherein the ductile member is bendable to transition the housing from the preform configuration to the installation configuration and is configured for retaining the housing in the installation configuration.

2. The air duct of claim 1, wherein the housing defines a plurality of cavities therethrough parallel to the central longitudinal axis, and further wherein each of the plurality of cavities is spaced apart from one another.

3. The air duct of claim 2, wherein the housing includes a first channel portion formed from the second extrudable material, and a second channel portion spaced apart from the first channel portion and formed from the second extrudable material.

4. The air duct of claim 3, wherein the ductile member is embedded in each of the first channel portion and the second channel portion.

5. The air duct of claim 3, wherein the housing further includes a connector formed from the first extrudable material and configured for releaseably connecting the first channel portion and the second channel portion.

6. The air duct of claim 1, wherein the housing has an outer wall configured for flexibly abutting the vehicle.

7. The air duct of claim 1, wherein the housing is positionable in three dimensions to transition the housing from the preform configuration to the installation configuration.

8. The air duct of claim 7, wherein the housing includes a plurality of hinges each formed from the first extrudable material and spaced apart from one another.

9. The air duct of claim 1, wherein the housing encapsulates the ductile member.

10. The air duct of claim 9, wherein the first extrudable material is a polymer and the third extrudable material is a metal.

11. The air duct of claim 1, wherein the housing has a length, and further wherein the ductile member extends along substantially the entire length.

12. The air duct of claim 11, wherein the ductile member is a continuous wire.

13. The air duct of claim 12, wherein the ductile member is configured as an elongated helix wound about the central longitudinal axis.

14. The air duct of claim 11, wherein the ductile member is discontinuous and includes a plurality of reinforcing elements spaced apart from one another along substantially the entire length.

15. The air duct of claim 1, wherein the cavity has a width of from about 100 mm to about 300 mm.

16. The air duct of claim 15, wherein the housing has a thickness of from about 1 mm to about 15 mm.

17. The air duct of claim 1, further including at least one attachment element configured for attaching the housing to the vehicle.

18. An air duct for a vehicle, the air duct comprising:
a housing formed from:
a first extrudable material having a first elastic modulus; and a second extrudable material that is different from the first extrudable material and has a second elastic modulus that is different from the first elastic modulus;

wherein the housing has a central longitudinal axis and defines a plurality of cavities therethrough each spaced apart from one another;

wherein the housing has a length and includes:
- a first channel portion formed from the second extrudable material; and
- a second channel portion spaced apart from the first channel portion and formed from the second extrudable material;

wherein the housing is transitionable from a preform configuration in which the central longitudinal axis is substantially straight, to an installation configuration in which the central longitudinal axis is tortuous;

at least one attachment element configured for attaching the housing to the vehicle; and a ductile member embedded within and encapsulated by the housing, wherein the ductile member extends along substantially the entire length of the housing and is formed from a third extrudable material having a third elastic modulus that is greater than each of the first elastic modulus and the second elastic modulus;

wherein the ductile member is bendable to transition the housing from the preform configuration to the installation configuration and is configured for retaining the housing in the installation configuration.

19. The air duct of claim 18, wherein the first extrudable material is a first polymer, the second extrudable material is a second polymer that is different from the first polymer, and the third extrudable material is a metal.

20. A vehicle comprising:

a body defining a passenger compartment and including a first component and a second component spaced apart from the first component;

a system configured for providing conditioned air to the passenger compartment and including:
- a distributor configured for expelling the conditioned air from the system; and
- a vent configured for discharging the conditioned air to the passenger compartment; and an air duct interconnecting the distributor and the vent, wherein the air duct includes:
- a housing formed from:
  - a first extrudable material having a first elastic modulus; and
  - a second extrudable material that is different from the first extrudable material and has a second elastic modulus that is different from the first elastic modulus;
- wherein the housing has a central longitudinal axis and defines a cavity therethrough along the central longitudinal axis;
- wherein the housing is transitionable from a preform configuration in which the central longitudinal axis is substantially straight, to an installation configuration in which the central longitudinal axis is tortuous so that the housing flexibly abuts the first component and the second component; and
- a ductile member embedded within the housing and formed from a third extrudable material having a third elastic modulus that is greater than each of the first elastic modulus and the second elastic modulus;
- wherein the ductile member is bendable to transition the housing from the preform configuration to the installation configuration and is configured for retaining the housing in the installation configuration.

* * * * *